April 22, 1941.     C. S. TAYLOR     2,239,474
COW HOBBLE
Filed Feb. 27, 1939

C. S. Taylor
INVENTOR.
BY *CA Snowles*
ATTORNEYS.

Patented Apr. 22, 1941

2,239,474

UNITED STATES PATENT OFFICE 2,239,474

COW HOBBLE

Charles S. Taylor, Chewelah, Wash.

Application February 27, 1939, Serial No. 258,791

1 Claim. (Cl. 119—126)

This invention aims to provide a simple but strong and efficient hobble for holding the leg of an animal at an angle.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
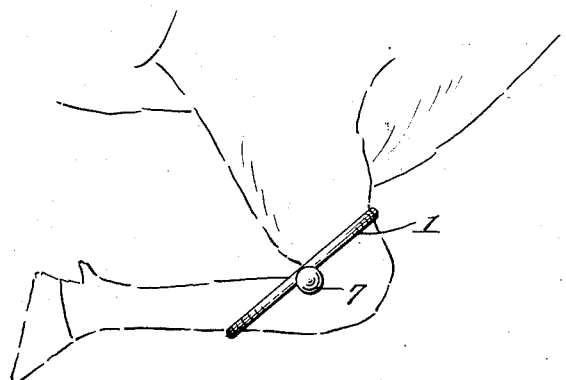
Fig. 1 shows in side elevation, a hobble constructed in accordance with the invention, mounted on the leg of an animal.

The hobble forming the subject matter of this application preferably is made of metal and includes a body, comprising an elongated or elliptical ring 1, supplied intermediate its ends with oppositely disposed, outstanding ears 2 and 3, the ear 2 having a circular opening 4, and the ear 3 having a keyhole slot 5.

A cross bar 6 is mounted for rotation in the circular opening 4 of the ear 2, and in the enlarged part of the keyhole slot 5 in the ear 3. An enlarged head 7 on one end of the bar, engaging the outer surface of the ear 2, and a lateral projection 8 on the bar, engaging the outer surface of the ear 3, limit the endwise movement of the bar, and the bar forms, within the ring, opening 9, adapted to receive parts of the leg of a cow or other animal, as depicted in Fig. 1.

The bar 6 can be rotated until the projection 8 is lined up with the extension of the keyhole slot 5, and, then, the bar 6 may be withdrawn from the ear 3, the leg of the animal being set free. The projection 8, cooperating with the ear 2, prevents the bar 6 from being detached from the ring 1, when the device is not in use.

The article is simple in construction, but will be found thoroughly advantageous for the ends in view.

Figure 2:
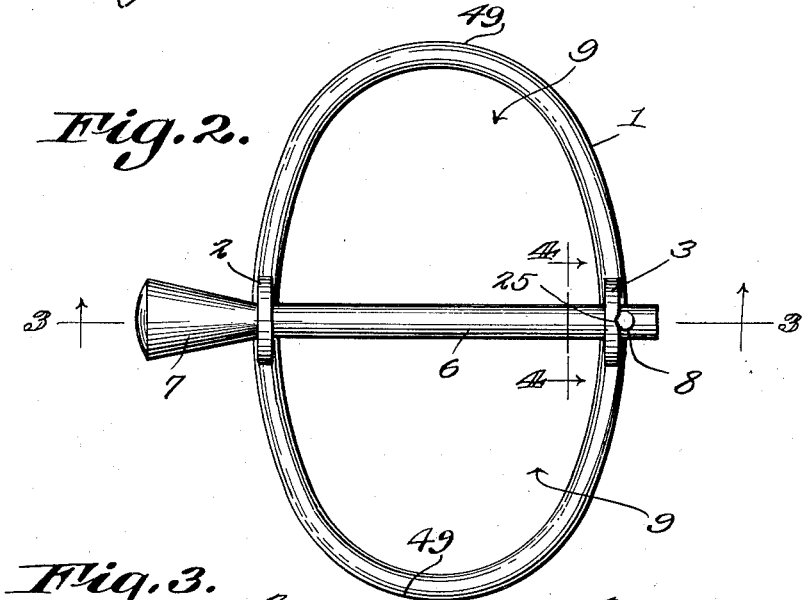
Fig. 2 is a plan of the hobble.
Figure 3:
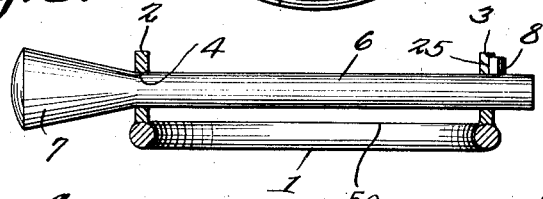
Fig. 3 is a section on the line 3—3 of Fig. 2.
Figure 4:
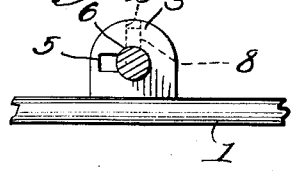
Fig. 4 is a section on the line 4—4 of Fig. 2.

The bar 6 can be held against rotation, when in the position of Figs. 2 and 3, because the outer surface of the ear 3 has a shallow seat 25, adapted to receive the projection 8 on the bar, as shown in Fig. 2. The ears 2 and 3 have spring enough to let the projection 8 lodge in the seat 25, but the projection can be disengaged from the seat by a forcible rotation of the bar 6.

The knee hobble forming the subject matter of this application comprises a ring 1, provided intermediate its ends 49 with ears 2 and 3 extended laterally beyond one side 50 of the ring, and a bar 6 extended across the ring and mounted in the ears, the bar being movable endwise, from its position across the ring, to open the ring for the reception of the knee of an animal, the ears 2 and 3 serving to space the bar 6 from said side 50 of the ring, to form a triangle defined by the bar and said ends 49 of the ring, thereby to put a maximum bend into an animal's leg, and to set said ends 49 back from the apex of the bend.

Having thus described the invention, what is claimed is:

A hobble comprising an elongated ring, provided intermediate its ends with ears extended laterally beyond one side of the ring, one ear being provided with an opening, and the other ear being provided with a keyhole slot, a bar in the opening and in the enlarged part of the keyhole slot and conforming in cross section thereto, the bar having a head and a lateral projection cooperating with the outer surfaces of the respective ears, to hold the bar in working position, the bar being rotatable to aline the projection with the reduced part of the keyhole slot, and then being movable longitudinally until the projection passes through the slot and engages the inner surface of the first specified ear, to hold the bar in inoperative position but permanently assembled with the ring, the ears serving to space the bar, when in working position, from said side of the ring, whereby a plane passing through the bar and parallel to the plane of the ring will always be spaced from the ring surface and will intersect both ears, thereby to put an effective, maximum bend into an animal's leg, and to set said ends back from the apex of the bend.

CHARLES S. TAYLOR.